Dec. 10, 1957  W. B. HALE  2,815,901
COMPRESSOR STRUCTURE
Filed Aug. 25, 1953  8 Sheets-Sheet 1

WILLIAM B. HALE
INVENTOR.

BY Lyon & Lyon
ATTORNEYS.

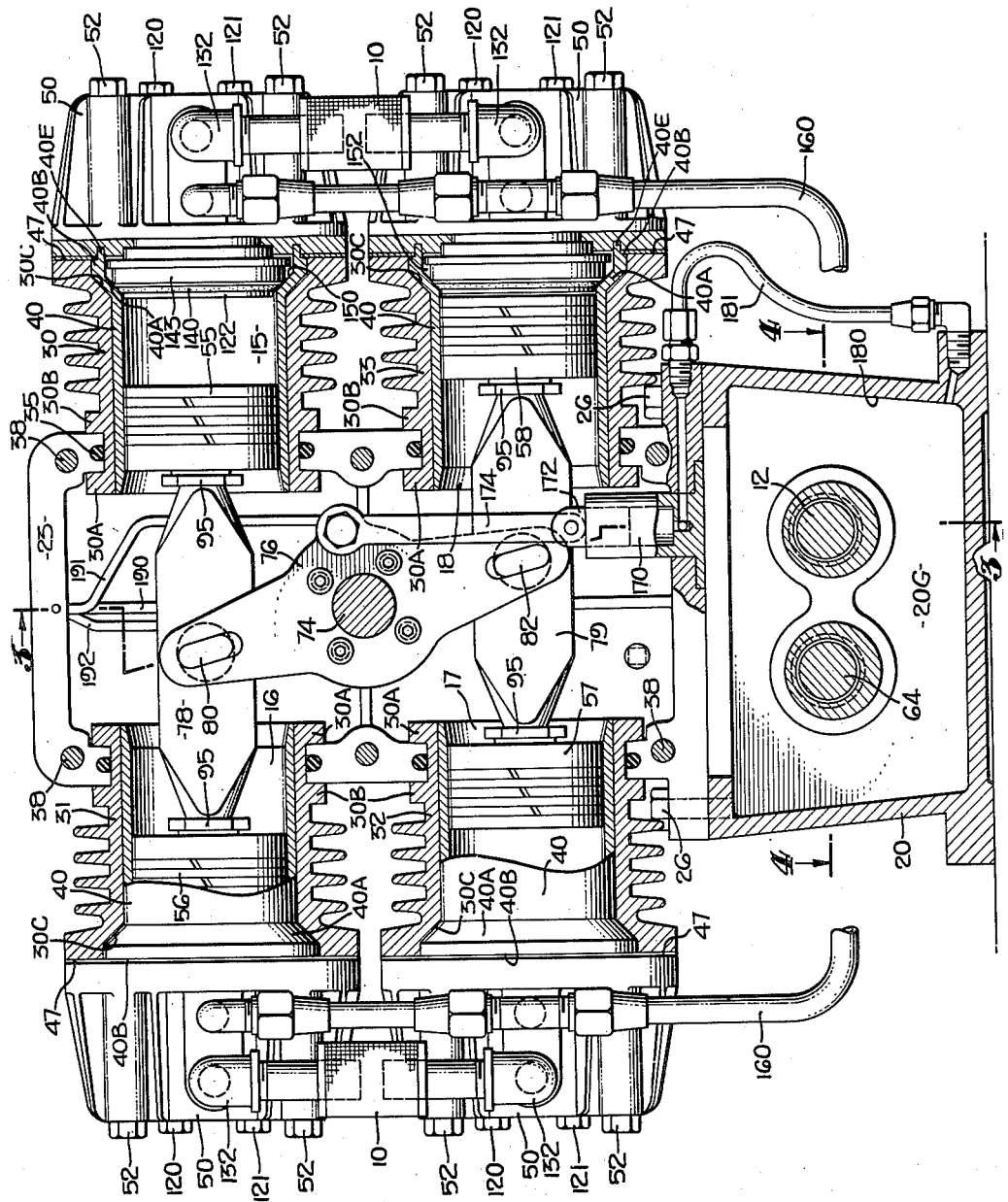

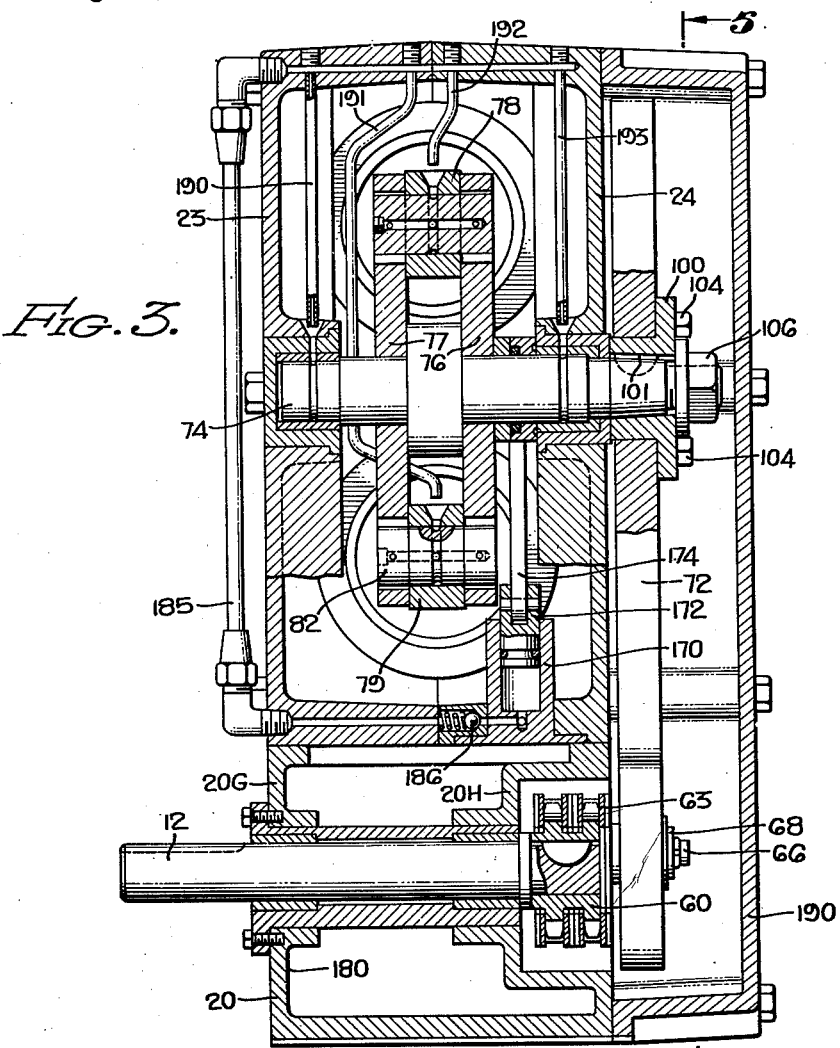

Dec. 10, 1957  W. B. HALE  2,815,901
COMPRESSOR STRUCTURE
Filed Aug. 25, 1953  8 Sheets-Sheet 4
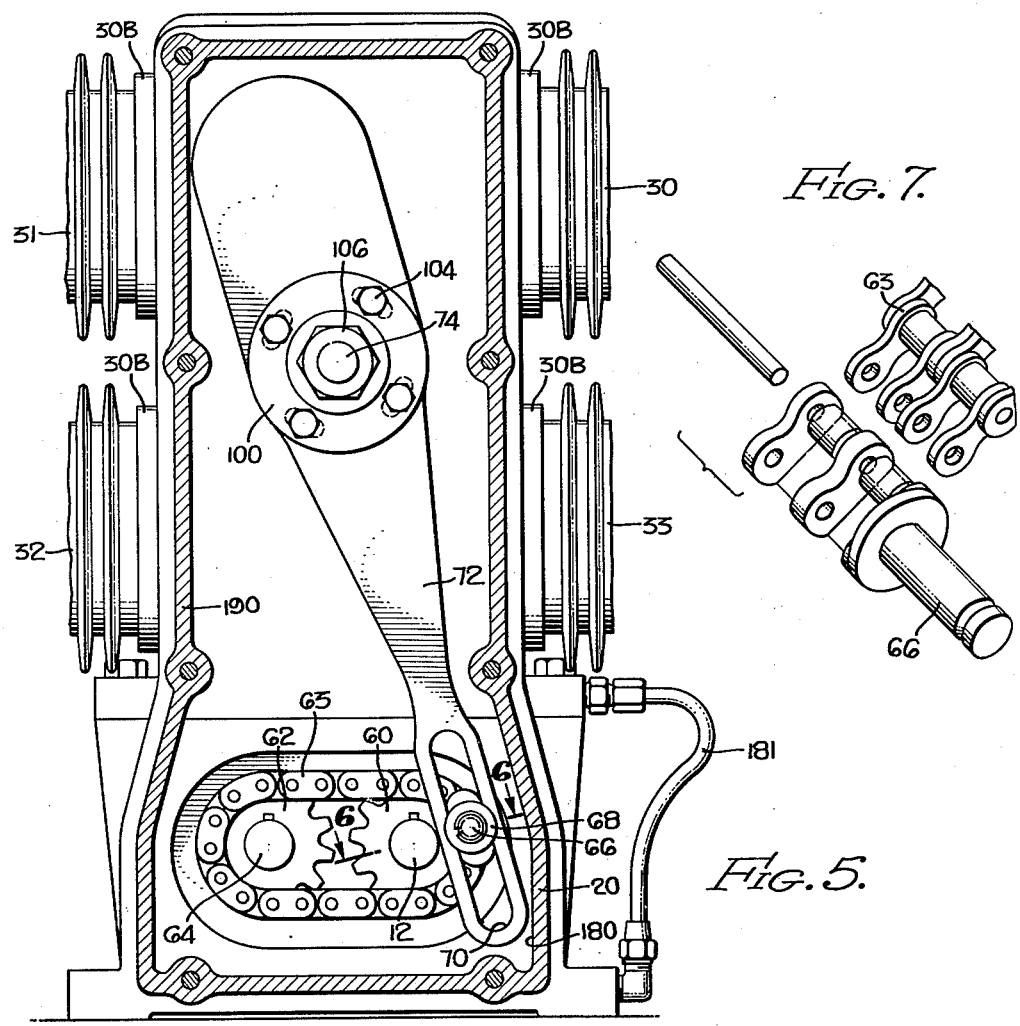
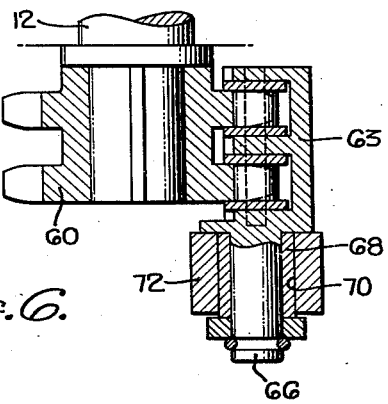
WILLIAM B. HALE
INVENTOR.
BY Lyon & Lyon
ATTORNEYS Dec. 10, 1957 W. B. HALE 2,815,901
COMPRESSOR STRUCTURE
Filed Aug. 25, 1953 8 Sheets-Sheet 6
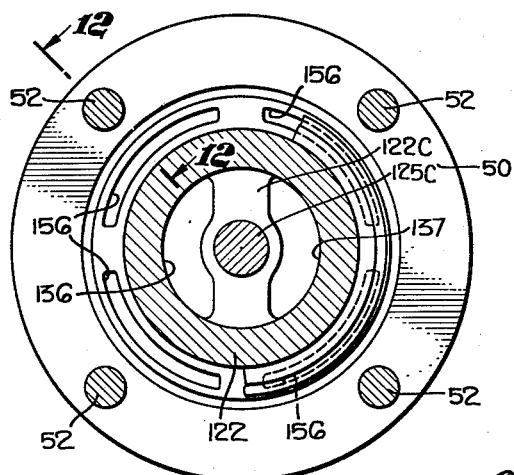
FIG. 9.
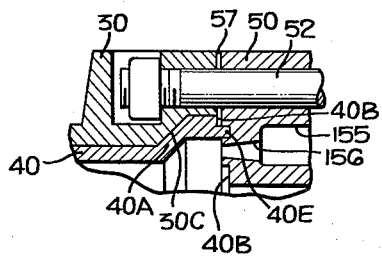
FIG. 12.
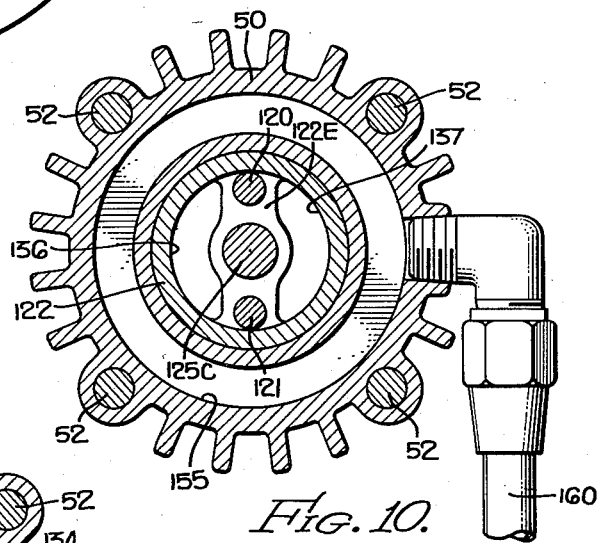
FIG. 10.
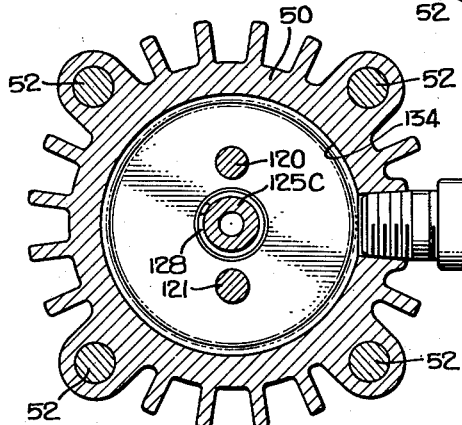
FIG. 11.
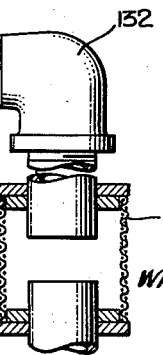
WILLIAM B. HALE
INVENTOR.
BY Lyon+Lyon
ATTORNEYS.

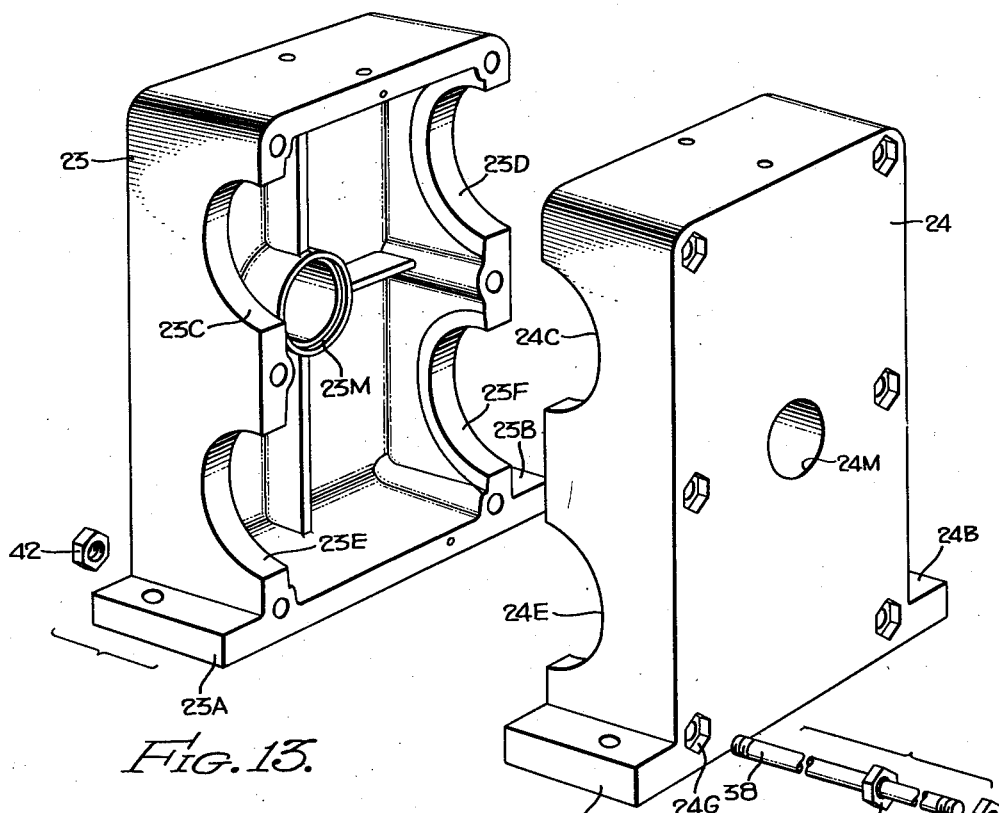
Fig. 13.
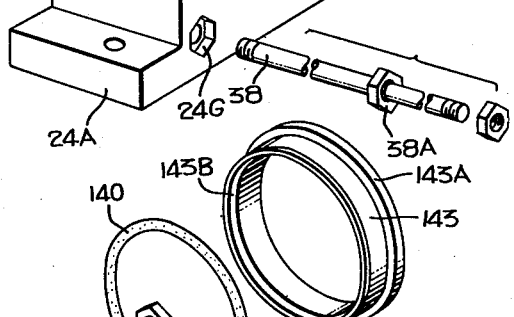
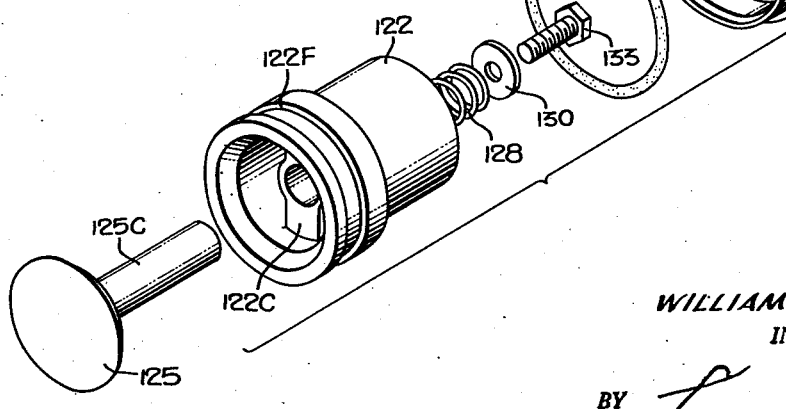
Fig. 14.
WILLIAM B. HALE
INVENTOR.
BY Lyon & Lyon
ATTORNEYS.

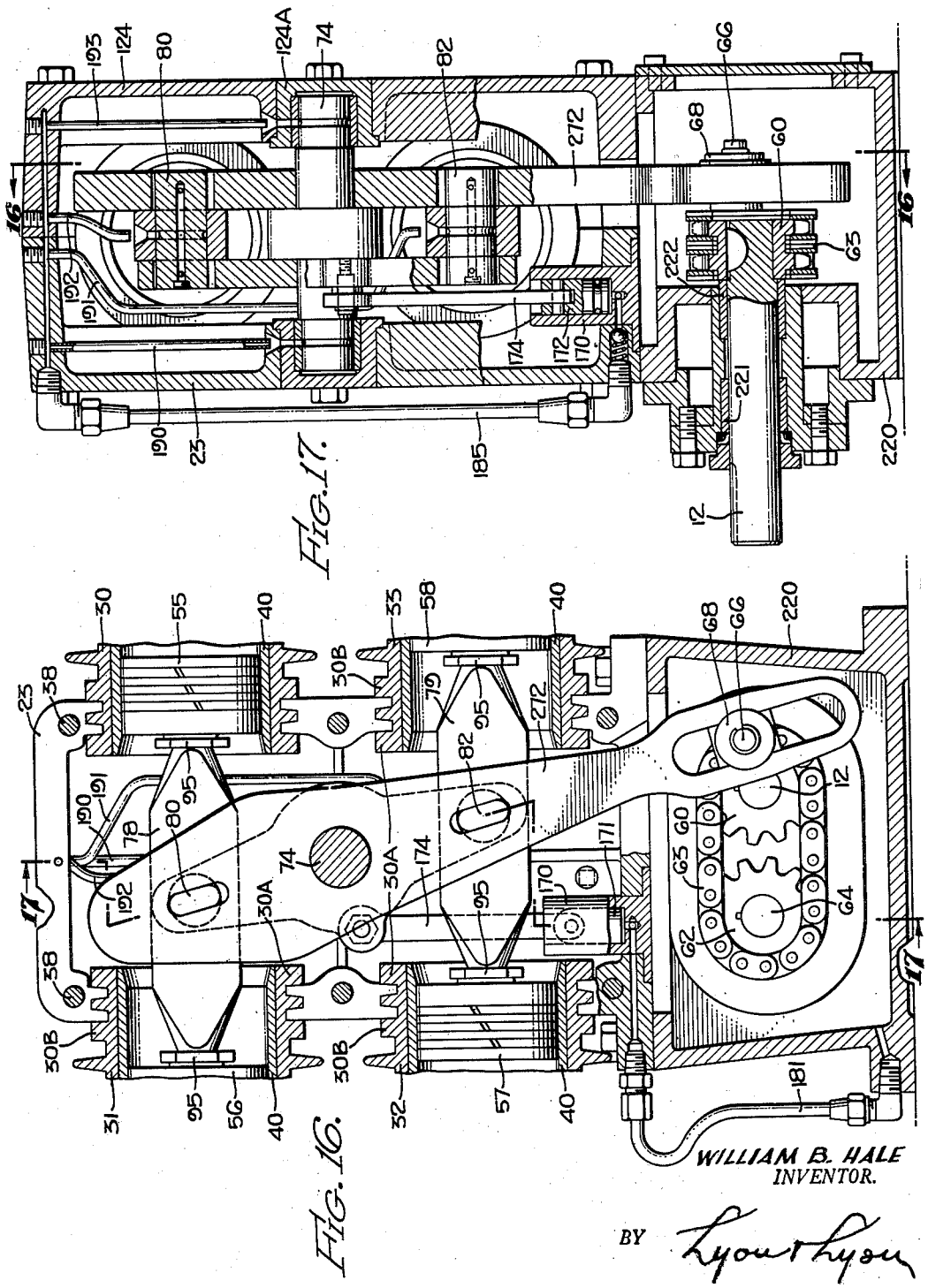

United States Patent Office 2,815,901
Patented Dec. 10, 1957

2,815,901

COMPRESSOR STRUCTURE

William B. Hale, Huntington Park, Calif., assignor to Hale Condenser Company, Inc., a corporation of California Application August 25, 1953, Serial No. 376,304

15 Claims. (Cl. 230—184)

The present invention relates to an improved compressor.

Briefly, the present invention is embodied in a single stage compressor of the double acting type which incorporates as features thereof, a new valving arrangement for the air cylinders, as well as the provision of novel mechanisms for transferring rotary movement of a motor shaft to transverse movement of the double acting pistons associated with such cylinders. Further, the compressor is characterized by the manner in which the compressed gases are cooled. Other features of the present invention reside in constructional details, the compressor housing structure, piston-cylinder assembly, and concentric arrangement of the inlet and outlet valves.

An object of the present invention therefore, is to provide an improved compressor which embodies the aforementioned features.

Another object of the present invention is to provide an improved compressor which is useful not only as an air compressor, but also as a compressor in a refrigeration system.

Another object of the present invention is to provide an improved air compressor characterized by its efficiency in accomplishing its intended purpose of compressing air to an elevated useful pressure.

Another object of the present invention is to provide an improved compressor which includes a circular outlet valve concentrically arranged with respect to the inlet valve for efficient heat transfer between the compressed gas and the incoming gas.

Another object of the present invention is to provide an improved compressor of this character set forth in the preceding paragraph in which the inlet valve is a relatively large circular valve axially aligned with the axis of the associated gas cylinder.

Another object of the present invention is to provide a valve structure as indicated above with the inlet valve and the outlet valve effectively presenting a flat surface at one end of the cylinder whereby the associated piston in such cylinder may traverse substantially the entire cylinder space so that substantially all of the air in the cylinder is ejected therefrom at the end of the piston compression stroke, and so that the amount of gas in the cylinder immediately after the compression stroke, which expands during the succeeding intake stroke, is greatly minimized.

Another object of the present invention is to provide a compressor characterized by its compactness, light weight, and small space requirements in accomplishing its intended purpose.

Another object of the present invention is to provide an improved compressor of the double acting type in which the pistons have imparted thereto a reciprocal movement by the use of a novel motion converting mechanism which allows "free floating" of the pistons in their associated cylinders.

A further object of the present invention is to provide an improved air compressor incorporating an improved unique driving mechanism for the purpose of compressing gas with increased efficiency, this unique driving mechanism for accomplishing this purpose including a driving lever which is driven in a novel manner for transferring rotary movement of a motor shaft to a transverse movement of double acting pistons, with the driving lever serving to compress a relatively large volume of air in a manner more efficient than is possible in present day crank shaft types of compressors.

A further object of the present invention is to provide an improved cylinder and associated head and valve assembly in a compressor characterized by the fact that the head comprises a unitary structure with an associated intake poppet valve occupying approximately three-quarters the area of an end wall of the cylinder and being flush therewith to allow the piston to completely fill the cylinder with gas even though the piston travels at high speed.

Another object of the present invention is to provide an improved compressor characterized by its unique discharge valve construction which allows the air to exhaust in a thin sheet around the entire circumference of a cylindrical wall which defines the air inlet passage to thereby effect efficient dissipation of the heat in the compressed gas as such compressed gas comes in contact with a substantial amount of metal of the valve chamber.

Still another object of the present invention is to provide an improved compressor of this type employing two double acting pistons of equal weight travelling in opposite directions and arranged to automatically balance themselves with no lost motion or loss in efficiency, such double acting pistons compressing air each half of the cycle, and the momentum of the pistons created by their weight and speed being absorbed at the peak of the piston discharge stroke to compress gas.

Still another object of the present invention is to provide an improved compressor which requires no flywheel, as such, the required inertia forces being developed by the momentum acquired in the operating parts themselves.

Still another object of the present invention is to provide an improved compressor which includes a driving lever interconnected to a piston through an actuating member, such actuating member being so designed with respect to weight that a balanced structure results and the necessity of a flywheel is avoided.

Still another object of the present invention is to provide an improved compressor characterized by the ease and simplicity with which the component parts are assembled, the compressor crankcase comprising two complementary parts with cooperating semi-bores in each to receive and embrace unitary cylinder structures which are maintained in place solely by their engagement with the semi-bores.

Still another object of the present invention is to provide an improved compressor constructed as mentioned in the preceding object and which includes a piston driving mechanism which automatically allows alignment of the piston in the cylinder in the event of misalignment of individual cylinders in the complementary casing halves.

While the present invention is described as applied to a single stage air compressor, with double acting pistons of the reciprocating horizontal type, it is clear that certain features thereof may be embodied in a multiple stage low pressure or in multiple stage high pressure machines for compressing gases for any purpose whatever, and may also be embodied in machines to raise or move water or for pumping fluid generally.

Another object of the present is to provide a compressor of this character which incorporates novel valving means which introduce gas into the cylinder and discharges such gas from the cylinder in a novel manner.

Another object of the present invention is to provide a compressor of this character having unique and novel preheating and after-cooling chambers that are an integral part of the cylinder head, with the intake and the discharge valves assembled in the so-called preheating chamber or "oven," and with such after-cooling chamber and preheating chamber being very simply constructed and highly efficient in the dissipation of substantially all of the heat developed during the compression of the gas.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 2 is a longitudinal sectional view taken on the line 2—2 of Figure 1, and shows the pistons at the extreme ends of travel wherein both the air inlet valve and the air outlet valve are each closed;

Figure 3 is a sectional view taken substantially on the line 3—3 of Figure 2;

Figure 4 is a sectional view taken substantially on the line 4—4 of Figure 2;

Figure 5 is a sectional view taken substantially on the line 5—5 of Figure 3;

Figure 6 is a sectional view taken substantially on the line 6—6 of Figure 5 showing details of the special link on the driving chain;

Figure 7 is a perspective view showing a portion of the driving chain, more particularly, a special connecting link in the chain with the connecting pin removed and the chain partly disassembled;

Figure 15:
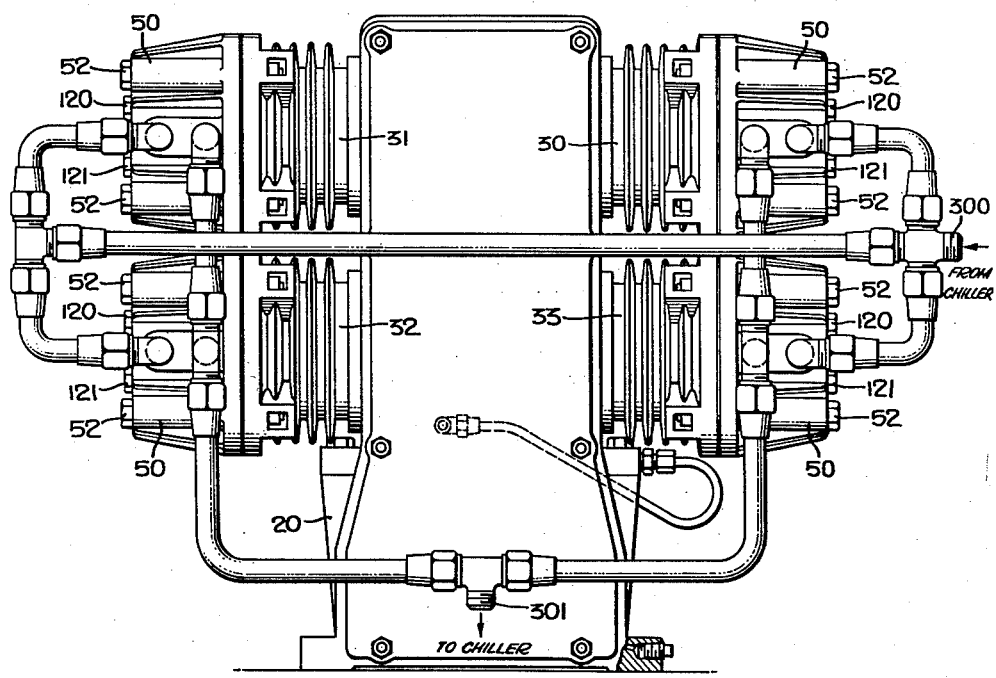
Figure 8:
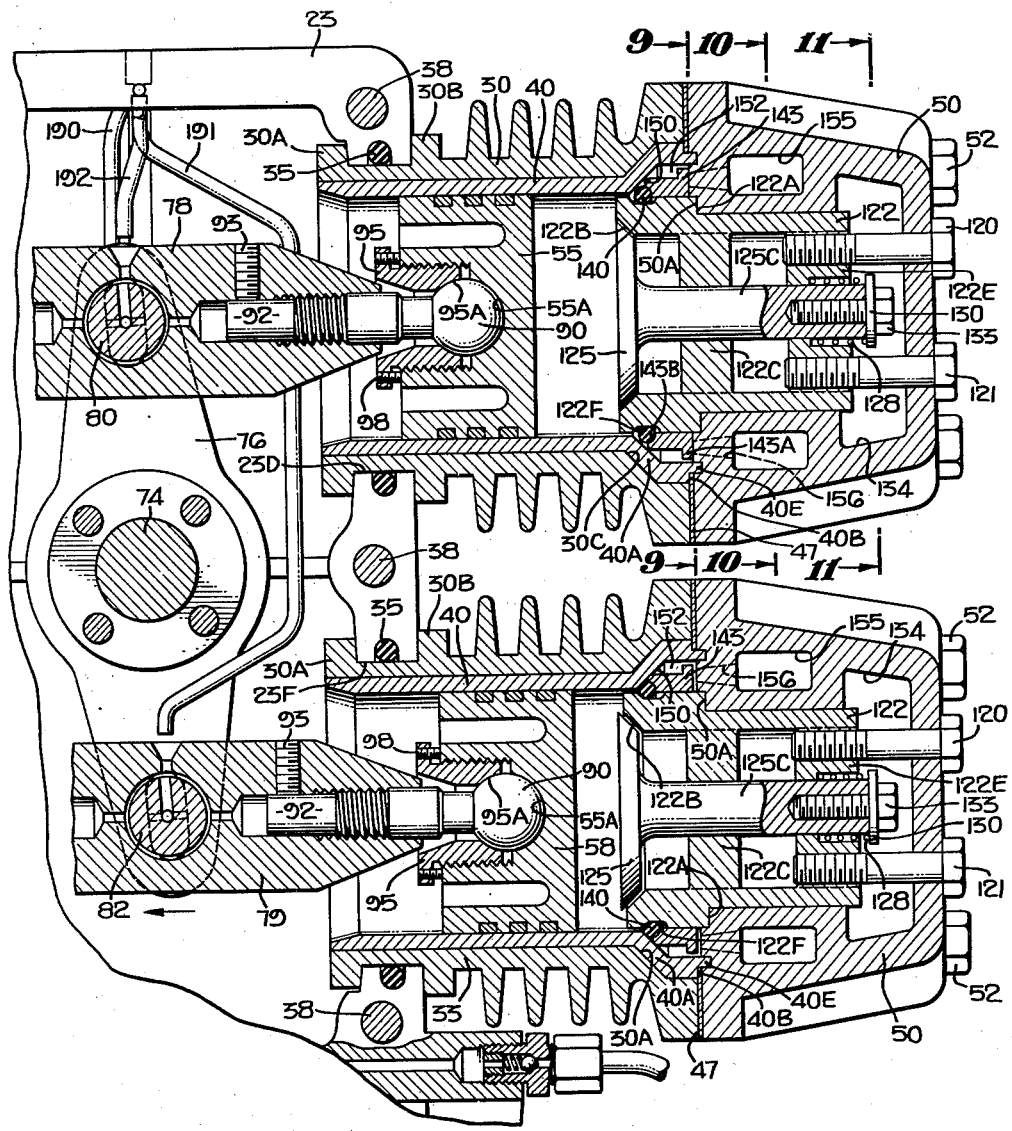
Figure 8 shows an enlarged form of a portion of the compressor illustrated in Figure 2, but with the pistons in an intermediate position wherein the upper outlet valve is open, the upper inlet valve is closed, and the lower outlet valve is closed and the lower inlet valve is open.

Figures 9, 10 and 11 are sectional views taken on corresponding lines 9—9, 10—10 and 11—11 in Figure 8;

Figure 12 is a sectional view taken substantially on the line 12—12 of Figure 9;

Figure 13 is an exploded view showing in perspective the cooperating casing halves and fastening bolts;

Figure 14 is an exploded view showing in perspective elements of the valve assembly illustrated in Figure 2;

Figure 15 is a view in side elevation, and shows a modified arrangement wherein the inlet and outlet conduits are connected for use in a refrigeration system, the previous figures showing the compressor for use as an air compressor;

Figures 16 and 17 relate to a modified simplified construction, Figure 16 being a view taken generally on the line 16—16 of Figure 17, and Figure 17 being a view taken generally as indicated by the line 17—17 in Figure 16.

The compressor shown herein may be used either as an air compressor or as a compressor in a refrigeration system. In the first instance, when used as an air compressor, the arrangement of parts are as illustrated in Figures 1–14, both inclusive; and when used in the second instance, in a refrigeration system, the elements are connected as illustrated in Figure 15.

A description of the air compressor as shown in Figures 1–14 is first presented herein, and then the manner in which the compressor is adapted for use in a refrigeration system is described later in connection with Figure 15.

Figure 1:
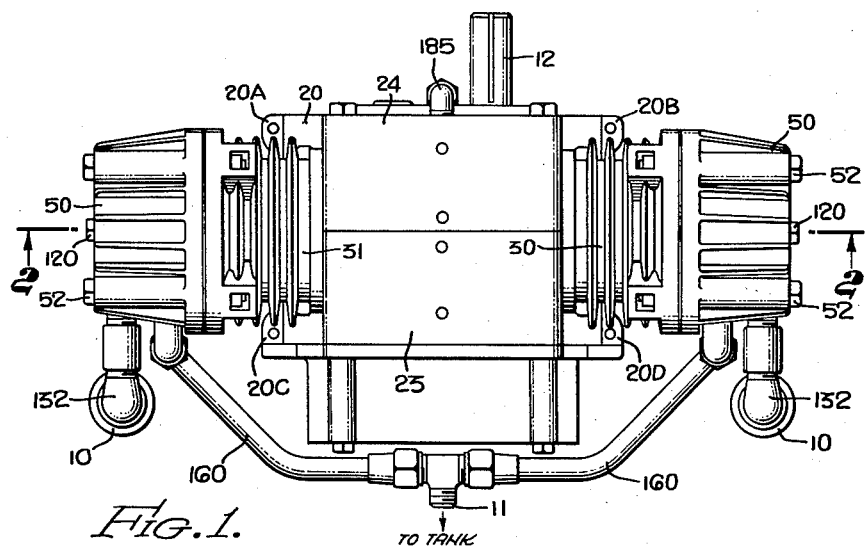
Figure 1 is a plan view of the compressor.

The compressor as shown in Figure 2 has two screened air inlets 10, 10 and one common air outlet 11 as illustrated in Figure 1. The compressor is adapted to be driven by a suitable prime mover such as an electric motor which is mechanically coupled to the compressor input shaft 12 (Figure 1).

The compressor is of the double acting type and includes one stage of compression. The compressor incorporates four different piston-cylinder assemblies as shown in Figure 2 and designated by the reference numerals 15, 16, 17 and 18, each of these assemblies being functionally in pairs 15, 16 and 17, 18 with each of such pairs symmetrically disposed about a central vertical axis through the compressor. The piston-cylinder assembly 15, 16 is of identical construction as the piston-cylinder assembly 17, 18 and for that reason a detailed description of the assembly 15, 16 and their inter-relationship with each other serves as a description of the other assembly 17, 18.

As a matter of fact, each of the piston assemblies 15 and 16 is identical and for that reason a detailed description of the piston-cylinder assembly 15 serves as a description of the other indvidual piston-cylinder assemblies.

The compressor as shown in Figures 2 and 4 has a hollow generally rectangular base member 20 which serves to house some of the mechanism as described later, and which has four apertured mounting ears 20A, 20B, 20C and 20D. This base or housing member 20 has bolted thereto, on the upper portion thereof, the pair of complementary housing or casing elements 23 and 24 (Figure 13), four bolts being provided for that purpose which pass through apertured portions in the casing mounting flanges 23A, 23B and 24A, 24B on the casing elements 23 and 24, respectively. The bolts used for that purpose are designated by the reference numeral 26 in Figure 2.

Each of these complementary casing halves 23 and 24 are formed with alignable semi-circular semi-bores 23C, 23D, 23E and 23F, and 24C, 24D, 24E and 24F in the halves 23 and 24, respectively, such semi-bores in opposite spaced walls of each of the casing halves as illustrated in Figure 13 are used as clamping elements to clamp the inner ends of each of the cylinders 30, 31, 32 and 33 as illustrated in Figure 2. Each of such cylinders are provided with heat radiating fins as shown in the drawings, and a pair of spaced annular flanges to snugly accommodate the semi-circular apertured portions of the casing halves 23 and 24. Such flanges are exemplified by the two circular flanges 30A and 30B on the cylinder 30 in Figure 2. Preferably, the arcuate surfaces of the casing semi-bores are grooved to accommodate an O-ring as exemplified by the O-ring 35 in Figure 2. These O-rings serve as seals and are squeezed when the casing halves 23 and 24 are bolted together by means of six bolts 38 (Figure 13) passing through aligned openings in the casing halves 23 and 24, each of such bolts 38 having welded thereto, at a point intermediate the ends thereof, a nut 38A which is recessed snugly in hexagon-shaped apertured portions 24G in one face of the casing half 24 with the nut 42 threaded on the protruding end of the bolt 38.

It should be clear from the structure thus far described, that the casing halves 23, 24 and associated fastening bolts 38 and fastening nuts 42 serve as a clamp for clamping and rigidly maintaining the four cylinders 30, 31, 32 and 33 in position. Each one of the cylinders has disposed therein a cast iron lining or insert 40, as shown in Figure 2. Such insert 40 is generally circular and conforms with the inner wall of the cylinder 30 which has a beveled portion 30C adapted to receive the flared portion 40A of the insert, and has an annular shouldered portion 40B engageable with the gasket member 47. Also, the outer end of the insert 40 comprises an annular ring portion 40E which is received in an annular groove in the cylinder head 50 and thus serves as a locating or positioning element. The cylinder head 50 is bolted to the cylinder 30 by four fastening bolts 52 as illustrated in Figure 12.

The aforementioned lining, insert 40, while cylindrical, is prevented from turning due to the engagement of the shouldered portion 40B thereof with the gasket 47.

Each of the four pistons 55, 56, 57 and 58 is of conventional construction having conventional piston rings mounted thereon, but is driven by a novel arrangement of elements which is now described.

The power input shaft 12 of the compressor is journaled for rotation in the spaced walls 20G and 20H (Figure 3) of the base 20, conventional bearings being used for that purpose. The base 20 as shown in Figure 3 is recessed to accommodate the driving sprocket 60, idler sprocket 62 and the sprocket chain 63, the sprocket 60 being mounted on the shaft 12, and the sprocket 62 being mounted on the idler shaft 64, as shown in Figure 4. The idler shaft 64 likewise is journaled for rotation in the spaced walls 20G and 20H of the base 20. As illustrated in Figures 6 and 7, the chain 63 is a link-type chain and there is welded to one link of such chain, the shaft 66 upon which is rotatably mounted the cam member 68 which cooperates with the spaced walls defining the elongated cam slot 70 in one end of the driving lever 72. When the cam member 68 moves in the orbital path defined by the chain, the driving lever 72 is oscillated to thereby produce oscillation of the shaft 74 upon which, as shown in Figure 3, is mounted the pair of spaced rocker or piston driving arms 76 and 77. These two rocker arms 76 and 77 partially embrace, on the one hand, the upper connecting rod or piston driving member 78 (Figure 2) and on the other hand, the lower connecting rod or piston driving member 79. The member 78 is driven, i. e., reciprocated by a motion converting means comprising the wrist pin 80. Likewise, the lower connecting rod 79 is reciprocated using a like connection which involves the lower wrist pin 82. For this purpose, the wrist pins are rotatably supported in the piston driving members 78 and 79 and have their opposite ends flattened to form generally rectangularly cross-sectioned ends as indicated in Figure 2, such ends being snugly engaged by the spaced walls of elongated cam slots in the piston rocker arms 76 and 77. The ends of the driving members 78 and 79 are connected to a corresponding piston using a ball and socket connection as now described in connection with Figure 8. Such ball and socket connection is preferred since the piston in such case has sufficient freedom of movement to automatically align itself, in its movement, in the event for any reason or other, the cylinders are not correctly positioned in alignment by the aforementioned construction which involves the complementary casing halves 23 and 24 (Figure 13) as clamping members for the cylinders.

For this purpose, each of the pistons, as exemplified by piston 55, has a semi-spherical recessed portion 55A conforming with the spherical surface of the ball 90 formed on the threaded rod 92 which is retained in the driving member or connecting rod 78 by set screw 93. The ball 90 is retained by the nut 95 which is threaded in the piston 55 and which has an inner annular arcuate face 95A conforming with the surface of the ball 90. The nut 95 may be retained on the piston 55 by set screws 98. This mechanism for reciprocating the pistons in their cylinders, described generally above, is now described with more detail. The driving lever 72 is affixed to the oscillatable shaft 74 using the construction illustrated in Figure 3 which involves a taper on the shaft 74, a tapered sleeve 100 with a key 101 thereon engageable with a key slot in the shaft 74, such sleeve 100 has an eccentrically exposed bore for adjustment purposes. Once such sleeve is adjusted, it is locked in adjusted position by the bolts 104 and then more firmly maintained in position by the nut 106 threaded on shaft 74. The shaft 74 is journaled for rotation in the bearings which are inserted in the walls of the casing halves 23 and 24, the recess for the bearing in casing halves 23 and 24 being illustrated at 23M and 24M in Figure 13.

Four valve heads 50 (Figure 12), one for each cylinder, are provided. The valve head 50 has secured thereto by a pair of bolts 120, 121 a modified cylindrical valve member 122 (Figure 8) which has an annular shoulder 122A engageable with the shoulder 50A of the valve head 50. The valve disc 125 has a beveled peripheral portion which is engageable with the annular bevel valve seat 122B, the valve element 125 having a cylindrical stem 125C which passes through the apertured rib 122C; and such valve 125 is normally biased to the closed position by the pre-stressed coil compression spring 128 having one of its ends abutting the web 122E and the other one of its ends abutting the washer 130 which is retained by the bolt 133 threaded in the valve stem 125C. The aforementioned webs 122C and 122E allow passage of incoming air on the intake stroke of the compressor, the input air in such case flowing from the inlet 10 through conduit 132 into a so-called annular evaporator chamber 134, and through the arcuate openings 136, 137 which are on opposite sides of the webs 122C and 122E (Figures 9 and 10) and then past the valve 125 when in open position, as illustrated in the bottom part of Figure 8.

The valve member 122, as shown in Figures 8 and 14, has an outer annular groove 122F which is adapted to accommodate an O-ring 140; and such valve element 122 slidably mounts the modified ring 143 which has an outer flanged portion 143A and which has an annular grooved portion 143B of arcuate cross-section as shown in Figure 8 to conform with the curvature of the O-ring 140. The ring 143 and O-ring 140 constitutes movable elements of a check valve in that, as shown in the bottom portion of Figure 8, the O-ring 140 is adapted to seal the annular opening 150 which is defined, on the one hand by the periphery of the inner sleeve 40 and on the other hand by the modified cylinder 122. The O-ring 140 is thus adapted to be squeezed into closed position by air pressure within a reservoir or tank connected to the outlet of the compressor as described herein.

When the piston 55 moves to the right in Figure 8 in the compression stroke, a sufficient distance to compress the air entrapped in the cylinder to a sufficiently high pressure, the O-ring 140 automatically moves to open position in which case the air is discharged through the annular opening 150 in the form of a thin sheet of air with the air flowing into the annular space 152 (Figure 8) which is in communication with the annular so-called after-cooling chamber 155 through the four ports or channels 156 (Figure 9). Such annular after-cooling chamber 155, as shown in Figure 10, is in communication with the outlet conduit 160, such outlet conduit 160 leading to an air storage tank or reservoir. On the intake stroke the air in such reservoir or tank acts to move the O-ring 140 into sealing position.

The air which is compressed is, of course, heated and a substantial portion of the heat thus developed by compression is transferred by the metal which comprises the cylinder head 50 from the compressed air in the annular cooling chamber 155 to the annular oven or preheating chamber 134 wherein the incoming air is heated in sufficient amount to raise the temperature of the incoming air to a sufficiently high degree to cause the moisture of the entering air to be heated due to the good heat conduction between the so-called preheating chamber 134 and the after-cooling chamber 155.

Provisions are made for lubricating various elements and the means for this purpose includes a pump 170 (Figures 2 and 3) and associated conduits. The cylinder of the pump 170 comprises a flanged closed-ended cylinder with the flange recessed in the casing half 24 and with the base of the cylinder contacting the base 20. A piston 172 slides in the pump cylinder and is pin-connected by the link 174 to the hub of the driving lever 76 to produce a reciprocatory movement of the piston 172. The piston 172 draws up oil from the sump or oil reservoir 180 which is defined by the base 20 through the interconnecting conduit 81. The pump cylinder 170 is in communication with the oil supply line 185 through the check valve 186. The supply line 185 extends to the upper end of the compressor housing and is in communication with a series of oil supply conduits 190, 191, 192, 193, through which oil may gravitate as shown in Figure 3 to lubricate the space bearings for the main shaft 76 and to lubricate the wrist pins 80 and 82. In the modified arrangement illustrated in Figures 16 and 17, the compressor is simplified in that the driving lever 272 performs generally the combined functions of the levers 72 and 76 in Figure 3. Thus, it becomes unnecessary to provide the removable cover 190 as shown in Figure 3 since in the modified arrangement illustrated in Figures 16 and 17 the driving lever 272 is disposed between the casing halves. This change necessitates movement of the pump 170, as shown in Figure 2, from a position to the right of the center line to a position to the left of the center line as illustrated in Figure 17. Elements which are of identical construction and/or have identical functions in the arrangement illustrated in Figure 1, as well as in the modified arrangement illustrated in Figures 16 and 17, have identical reference numerals.

It is observed that Figure 17 corresponds generally to Figure 3 and that Figure 16 corresponds generally to Figure 2.

It is specifically observed that the casing half 124 in Figure 17 which corresponds to the casing half 24 in Figure 3 is provided with the closed-ended sleeve 124A to receive one end of the shaft 74 since in the simplified arrangement in Figure 17 it is not necessary that the shaft 74 extend through the casing half 124. The base 220 in Figure 17 serves as a reservoir for the lubricating oil which is pumped by the auxiliary pump 170 and is provided with spaced bearings 221 and 222 within which the input shaft 12 is rotatably supported to drive the sprocket wheel 60 and chain 63, such chain 63 being connected to the driving lever 272 by the element 68 which is free to slide in the lost-motion slot in the driving lever 272. The unit illustrated in Figure 1 when adapted for use in a refrigeration system has the various inlet and outlet openings thereof interconnected by conduits as illustrated in Figure 15. All of the inlets are connected by conduits to the fitting 300 which is in communication with the so-called chiller unit to receive refrigerant from the chiller unit, such refrigerant after being chilled, being connected by conduits to the fitting 301 to convey the compressed refrigerant back to the chilling unit.

It is observed that the condenser or air compressor described above incorporates a valve arrangement which is different from conventional valve structures heretofore used in that this new valve structure involves novel concepts in the manner in which the air is introduced into the cylinders and discharged therefrom. More specifically, the cylinder heads as described herein are believed to be unique and novel in that so-called preheating and after-cooling chambers are cast in the cylinder heads. The intake and the discharge valves are assembled in the so-called preheating chambers or ovens.

Further, the round cylindrical type discharge valve is highly efficient in that it allows the air to exhaust in a thin sheet around the entire circumference of the cylinder wall. The air comes in contact with a greater amount of the metal of the cylinders and the valve chambers, and the expansion of the air from a higher cylinder pressure to a lower valve chamber pressure serves to dissipate substantially all of the heat developed during compression, since the air passes or leaves the valve chamber in a thin sheet into the after-cooling chambers.

For these general purposes the inlet preheating chamber or oven has approximately four times the volume of the piston displacement, i. e., the volume of air taken in a suction stroke of the piston so that the air in such inlet chamber moves at a relatively low average speed to allow the moisture in said chamber to be heated as a result of the heat transferred through the wall which separates the inlet chamber from the outlet chamber. It is observed also that the after-cooling chamber has approximately seven or eight times the volume of the piston displacement, i. e., the volume of air taken in the cylinder during one complete suction stroke.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a compressor of the character described, a cylinder assembly, a valve head releasably secured to said assembly, a modified cylinder element releasably secured within said valve head, a valve element slidably mounted in said modified cylindrical element, means normally biasing said valve element in closed position against said cylindrical element, said cylindrical element having an annular outer grooved portion, an O-ring disposed in said grooved portion, a ring slidably mounted on said cylindrical element, said ring having an arcuate face engageable with said O-ring, said valve head having two inner concentrically disposed chambers, one of said chambers defining an outlet after-cooling chamber and the other one of said chambers comprising an inlet chamber, said O-ring being disposed in a passageway to said outlet chamber and being movable by air pressure applied to said slidably mounted ring to seal said passageway, and said inlet chamber being in communication with a second passageway controlled by said normally closed valve element.

2. In a compressor of the character described, a crankcase comprising a pair of complementary halves each having cooperating semi-bores, a unitary cylinder structure snugly embraced within cooperating semi-bores, said cooperating semi-bores providing a first aligned pair of means for maintaining in place a corresponding first pair of aligned cylinders, said cooperating semi-bores providing a means whereby a second pair of cylinders is maintained in aligned position, a piston mounted in each of said pairs of cylinders mounted for movement in parallel directions, a lever element pivoted about an axis extending between said pairs of aligned cylinders and perpendicular to the axes of said cylinders, means pivotally mounting said lever element for movement about said axis extending between said pairs of aligned cylinders, the last-mentioned means comprising a rotatable shaft, a driving lever mounted on said shaft, said driving lever having a cam slot disposed in one end thereof, a cam element disposed in said cam slot, a driven chain, and said cam element being mounted on said chain, and means connecting said lever element to each of said pistons for establishing a driving connection therebetween.

3. In a compressor of the character described, a crankcase comprising a pair of complementary halves each having cooperating semibores, a unitary cylinder structure snugly embraced within cooperating semi-bores, said cooperating semi-bores providing a first aligned pair of means for maintaining in place a corresponding first pair of aligned cylinders, said cooperating semi-bores providing a means whereby a second pair of cylinders is maintained in aligned position, a piston mounted in each of said first and second cylinders mounted for movement in parallel directions, a lever element pivoted about an axis extending between said pairs of aligned cylinders and perpendicular to the axes of said cylinders, means pivotally mounting said lever elements for movement about said axis extending between said pairs of aligned cylinders, a rotatable shaft, said rotatable shaft being rotatably supported in said complementary halves and having said lever element mounted thereon, a wrist pin rotatably mounted in each of said pistons, the outer ends of each of said wrist pins being flattened and cooperating with cam slots in said lever element, and means for oscillating said shaft.

4. In a compressor of the character described, a crankcase comprising a pair of complementary halves each having cooperating semi-bores, a unitary cylinder structure snugly embraced within cooperating semi-bores, said semi-bores providing a first aligned pair of means for maintaining in place a corresponding pair of aligned cylinders, said cooperating semi-bores providing a means whereby a second pair of cylinders is maintained in aligned position, a piston mounted in each of said first pair and second pair of cylinders mounted for movement in parallel directions, a shaft rotatably supported on said complementary halves, a plurality of piston driving elements, a corresponding one of said driving elements being connected to a corresponding pair of pistons in aligned cylinders, a pair of levers disposed on opposite sides of said piston driving elements, means connecting said levers to said driving element for establishing a driving connection therebetween said pair of levers being mounted on said shaft, and means for oscillating said shaft.

5. The arrangement as set forth in claim 4 in which one of said pair of levers has a cam slot disposed therein, a cam element in said cam slot, a driving element movable in an orbital path, and said cam element being mounted on said driving element.

6. The arrangement set forth in claim 4 in which said shaft extends through said complementary halves, a driving lever mounted on said shaft externally of said complementary halves, said driving lever having a cam slot disposed therein, a cam element disposed in said slot, a driving element movable in an orbital path and mounting said cam element.

7. In a compressor of the character described, a crankcase comprising a pair of complementary halves each having cooperating semi-bores, a unitary cylinder structure snugly embraced within cooperating semi-bores, said cooperating semi-bores providing a first aligned pair of means for maintaining in place a corresponding pair of aligned cylinders, said cooperating semi-bores providing a means whereby a second pair of cylinders is maintained in aligned position, a piston mounted in each of said pair of cylinders mounted for movement in parallel directions, a piston driving member interconnecting a corresponding pair of pistons, a shaft rotatably supported in said complementary halves with its axis disposed between said first pair and second pair of cylinders, a wrist pin extending through each of said piston driving elements, a pair of levers mounted on said shaft and being disposed on opposite sides of each of said piston driving elements, each of said wrist pins having their outer ends flattened and disposed in cam slots in each of said levers, and means for oscillating said shaft.

8. The arrangement as set forth in claim 7 in which one of said levers has a cam slot disposed therein, said oscillating means comprising a member movable in an orbital path, a cam mounted on the last-mentioned element, said cam being disposed in said cam slot in said lever.

9. In a compressor of the character described, a crankcase comprising a pair of complementary halves each having cooperating semi-bores, a unitary cylinder structure snugly embraced within cooperating semi-bores, said cooperating semi-bores providing a first aligned pair of means for maintaining in place a corresponding pair of cylinders, said cooperating semi-bores providing a means whereby a second pair of cylinders is maintained in aligned position, a piston mounted in each of said first and second mentioned cylinders mounted for movement in parallel directions, a lever element pivoted about an axis extending between said pair of aligned cylinders and perpendicular to the axes of said cylinders, means pivotally mounting said lever element for movement about said axis extending between said pairs of aligned cylinders, the last-mentioned means comprising a rotatable shaft which is rotatably supported in said crankcase, a unitary valve structure releasably secured to each of said cylinders, said unitary valve structure comprising a valve head, means releasably securing said valve head to a corresponding one of said cylinders, a cylindrical valve element disposed within said valve head, a valve element slidably mounted in said cylindrical element, means acting between said cylindrical element and said valve element to maintain said valve element in a normally closed position, said cylindrical valve element having an outer annular groove, an O-ring disposed within said groove, a ring element slidably mounted on said cylindrical valve element, said valve head defining two chambers separated by a common heat exchanging wall, one of said chambers being an outlet after-cooling chamber and the other one of said chambers being an inlet preheating chamber, said inlet chamber being in communication with said cylinder through said normally closed valve element, said outlet chamber being in communication with said cylinder through a passageway within which said O-ring is disposed, the air pressure in said outlet chamber being effective to move said slidably mounted ring element into engagement with said O-ring to move the same and to block said passageway.

10. In a compressor of the character described, a pair of axially aligned piston cylinder assemblies, a second pair of axially aligned piston cylinder assemblies, said assemblies being spaced from each other with their corresponding pistons movable generally in mutually parallel directions, a lever pivotally mounted about an axis extending between said first and second assemblies and extending generally perpendicular to said parallel directions, said lever having a pair of cam slots and a third cam slot, a pair of wrist pins, each of which is mounted on a corresponding one of a pair of aligned pistons of said aligned piston cylinder assemblies, said wrist pins having at least one of their ends flattened, the flattened end of a corresponding wrist pin being disposed in a corresponding one of said pair of cam slots in said lever, a driving element movable in an orbital path, said driving element having a cam element mounted thereon, and said cam element being disposed in said third cam slot in said lever.

11. In a compressor of the character described, a cylinder, a piston movable in said cylinder, a unitary valve structure comprising a valve head, said valve head having two annularly disposed chambers in heat conducting relationship to each other, said chambers being separated by a common heat exchanging metallic wall, one of said chambers comprising an outlet after-cooling chamber in communication with said cylinder and the other one of said chambers comprising an inlet chamber in communication with said cylinder, an inlet valve mounted on said head for controlling the flow of fluid from said inlet chamber, and valve means mounted on said head for controlling the flow of fluid to said outlet chamber, said inlet chamber and said outlet chamber each being substantially larger in volume than the displacement of said piston in said cylinder.

12. In a compressor of the character described, a cylinder, a piston movable in said cylinder, a unitary valve structure comprising a valve head, said valve head having two annularly disposed chambers, each of said chambers being in communication with said cylinders, and each having a volume which is substantially larger than the volumetric displacement of said piston in said cylinder, one of said chambers being an after-cooling outlet chamber and the other one of said chambers being an inlet preheating chamber, said chambers being in heat conducting relationship and being separated by a common wall of heat conducting material, a poppet valve slidably mounted in said head and controlling the flow of fluid from said inlet chamber, and valve means mounted on said valve head for controlling the flow of fluid to said outlet chamber.

13. In a compressor of the character described, a cylinder, a piston movable in said cylinder, a unitary valve structure comprising a valve head, said valve head having a pair of chambers in heat conducting relationship, each of said chambers being in communication with said cylinder, and each having a volume which is substantially larger than the volumetric piston displacement of said piston in its movement, said chambers being annularly disposed within said valve head with a common wall of heat conducting material separating said chambers, one of said chambers comprising an outlet after-cooling chamber and the other one of said chambers comprising an inlet preheating chamber.

14. In a compressor of the character described, a unitary valve structure comprising a generally cylindrical valve head, an annular member spaced from said valve head with said head and member defining an annular port therebetween, said valve head having an outer annular groove, an O-ring disposed in said groove, a ring slidably mounted on said valve head and having an arcuate face engageable with said O-ring, and said ring being movable under the influence of air pressure to engage and to move said O-ring into said port in a sealing position to seal said port.

15. In a compressor of the character described, a cylinder, a piston movable in said cylinder, a valve structure, said valve structure having a pair of chambers in heat conducting relationship, each of said chambers being in communication with said cylinder, and each having a volume which is substantially larger than the displacement of said piston in said cylinder in the movement of said piston, one of said chambers comprising an outlet after-cooling chamber and the other one of said chambers comprising an inlet preheating chamber, said inlet chamber being in communication with the atmosphere, said after-cooling chamber being in communication with a compression area of said compressor, the air entering said inlet chamber being heated by the heat developed in the gas while being compressed, such heat being transferred from the outlet chamber to said inlet chamber through a common heat exchanging wall which separates said after-cooling chamber from said inlet chamber, and the gas leaving said outlet chamber being cooled as a result of the heat transferred to the inlet chamber.

References Cited in the file of this patent

UNITED STATES PATENTS

| | | |
|---|---|---|
| 999,220 | Harmon | Aug. 1, 1911 |
| 1,628,096 | Worth | May 10, 1927 |
| 1,633,772 | Clapp | June 28, 1927 |
| 1,734,085 | Godstrey | Nov. 5, 1929 |
| 1,974,964 | Lyons | Sept. 25, 1934 |
| 2,559,067 | Doeg | July 3, 1951 |